(12) United States Patent
Nielson et al.

(10) Patent No.: US 8,204,939 B2
(45) Date of Patent: Jun. 19, 2012

(54) METHOD AND APPARATUS INITIATING INSTANT MESSAGING WITH A PARTY DURING A TELEPHONE CALL WHERE INSTANT MESSAGING ADDRESS AND TELEPHONE NUMBER ARE ASSOCIATED IN A DATABASE

(75) Inventors: Peter Dam Nielson, Kgs Lyngby (DK); Christian Kraft, Hvidovre (DK); Gregers Juul-Pedersen, Copenhagen K (DK); Hans Jacob Jespersen, Frederiksberg (DK)

(73) Assignee: Nokia Corporation, Espoo (FI)

( * ) Notice: Subject to any disclaimer, the term of this patent is extended or adjusted under 35 U.S.C. 154(b) by 1669 days.

(21) Appl. No.: 10/538,981

(22) PCT Filed: Dec. 18, 2002

(86) PCT No.: PCT/IB02/05576
§ 371 (c)(1),
(2), (4) Date: Jan. 23, 2006

(87) PCT Pub. No.: WO2004/056137
PCT Pub. Date: Jul. 1, 2004

(65) Prior Publication Data
US 2006/0129643 A1     Jun. 15, 2006

(51) Int. Cl.
*G06F 13/00* (2006.01)
(52) U.S. Cl. ....................................................... 709/206
(58) Field of Classification Search .................... 709/206
See application file for complete search history.

(56) References Cited

U.S. PATENT DOCUMENTS

| 6,301,609 B1 | 10/2001 | Aravamudan et al. ........ 709/207 |
| 6,763,226 B1 * | 7/2004 | McZeal, Jr. ................... 455/90.2 |
| 2001/0034224 A1 | 10/2001 | McDowell et al. ............ 455/412 |
| 2002/0035605 A1 | 3/2002 | McDowell et al. ............ 709/206 |
| 2002/0076027 A1 | 6/2002 | Bernnan et al. ........... 379/211.01 |
| 2002/0126701 A1 | 9/2002 | Requena ........................ 370/469 |
| 2002/0129103 A1 | 9/2002 | Birkler et al. ................. 709/203 |
| 2002/0165000 A1 | 11/2002 | Fok ................................ 455/466 |
| 2004/0037406 A1 * | 2/2004 | Gourraud ................. 379/202.01 |

FOREIGN PATENT DOCUMENTS

| EP | 1 130 869 A1 | 9/2001 |
| WO | WO 01/56308 A2 | 8/2001 |
| WO | WO 01/93047 A1 | 12/2001 |
| WO | WO 02/47320 A1 | 6/2002 |
| WO | WO 02/073332 A2 | 9/2002 |
| WO | WO 02/093889 A1 | 11/2002 |

* cited by examiner

*Primary Examiner* — Robert B Harrell
(74) *Attorney, Agent, or Firm* — Harrington & Smith

(57) ABSTRACT

A mobile telephone terminal provides a user with a selectable option to transfer a telephone call to an instant messaging session and to transfer an instant messaging session to a telephone call. A presence attribute indicator for a first party is displayed, in a mobile telephone application, with an entry associated with the telephone number of the first party. A user, while displaying an entry for a party in a mobile telephone application, has a selectable option for initiating instant messaging with the party. The mobile telephone provides a customised menu of selectable options for initiating communication. The menu is dependent upon received presence attribute information. A calendar application can store the content of an instant messaging dialogue in an appointment record. When an application accesses a stored telephone number of a party the stored instant messaging address of that party is automatically accessed or accessible and when the application accesses a stored instant messaging address of a party, the stored telephone number of that party is automatically accessed or accessible.

34 Claims, 3 Drawing Sheets

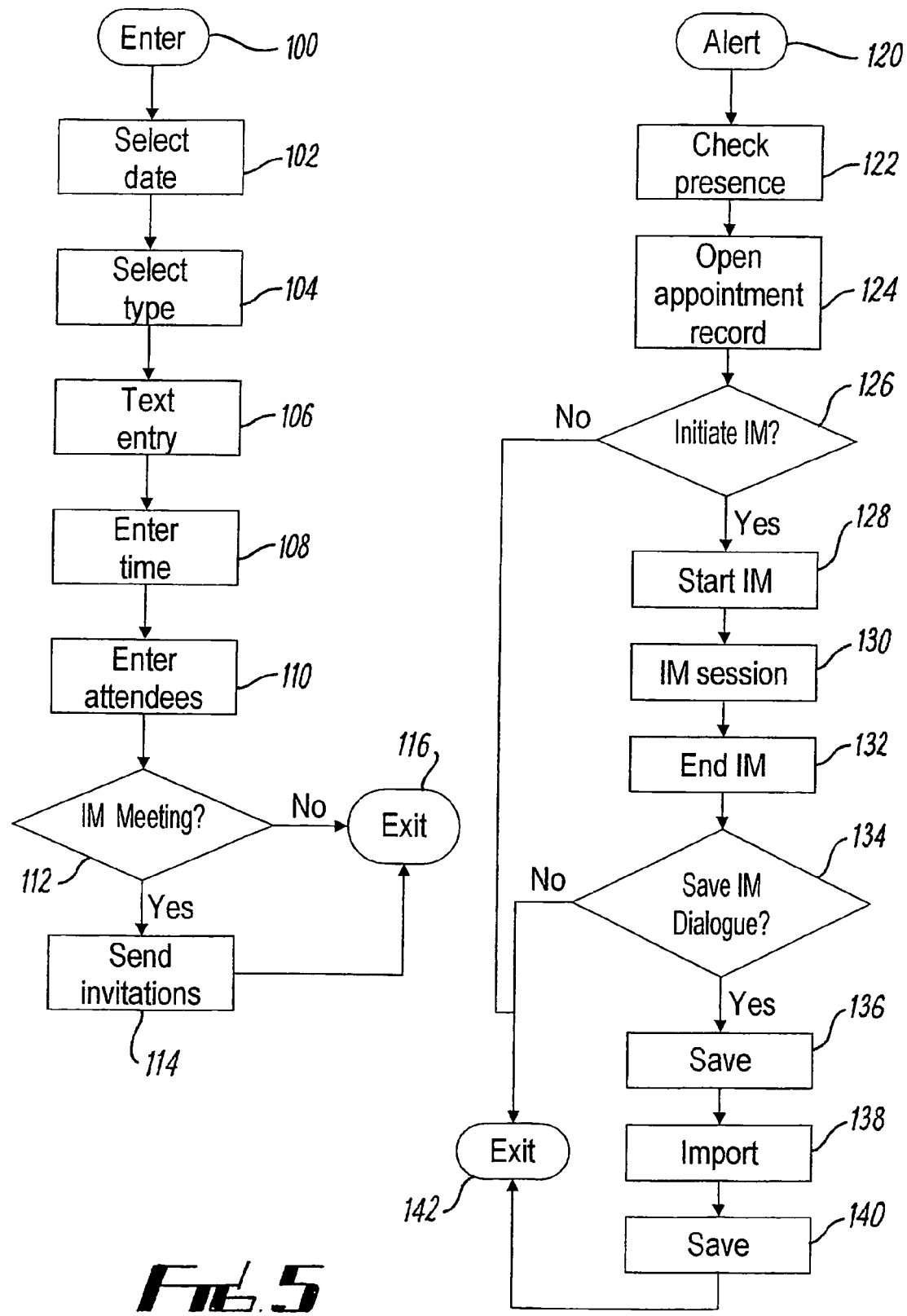

METHOD AND APPARATUS INITIATING INSTANT MESSAGING WITH A PARTY DURING A TELEPHONE CALL WHERE INSTANT MESSAGING ADDRESS AND TELEPHONE NUMBER ARE ASSOCIATED IN A DATABASE

FIELD OF THE INVENTION

Embodiments of the present invention relate to the integration of instant messaging functionality with the existing functionality of mobile telephones.

BACKGROUND OF THE INVENTION

The Wireless Village (www.wireless-village.org) is an initiative for Instant Messaging and Presence Services (IMPS) backed by a number of leading mobile telephone manufacturers. The Wireless Village has published a specification for IMPS.

The specification describes how an IMPS client communicates with a server to provide an Instant Messaging service and a Presence Attribute service. Instant messaging allows messages such as text, pictures or files to be sent between IMPS clients via the server. This allows two users to 'chat' interactively by exchanging messages instantly between their clients. Presence Attributes allow a user to publish attribute information about the user or their terminal, such as whether they are available for instant messaging, their preferred method of contact etc. Another IMPS client can obtain this attribute information and be informed of changes to the information.

The Wireless Village specifications are concerned with enabling IMPS which is a powerful new technology. They are not concerned with the how it will be integrated with existing technology.

SUMMARY OF THE INVENTION

It would be desirable to integrate mobile telephone functions and instant messaging and presence services.

According to a first aspect of the present invention there is provided a mobile telephone terminal arranged to provide a user with a selectable option during a telephone call with a first party, the selection of which initiates communication with the first party by instant messaging. There is also provided a method of changing the mechanism by which a first party and a second party communicate during a communication session comprising the steps of: communicating via a telephone call between the first and second parties; and displaying a user selectable option during the telephone call to at least one of the parties, the selection of which initiates the establishment of instant messaging between the parties. There is also provided a system for providing communication between a first party and a second party using a telephone call and instant messaging, arranged to switch a communication session between the parties from a telephone call to instant messaging.

According to a second aspect of the present invention the is provided a mobile telephone terminal arranged to provide a user with a selectable option while instant messaging with a first party, the selection of which initiates a telephone call with the first party. There is also provided a method of changing the mechanism by which a first party and a second party communicate during a communication session comprising the steps of: communicating via instant messaging between the first and second parties; and displaying a user selectable option during the instant messaging to at least one of the parties, the selection of which initiates the establishment of a telephone call between the parties. There is also provided a system for providing communication between a first party and a second party using a telephone call and instant messaging, arranged to switch a communication session between the parties from instant messaging to a telephone call.

According to a third aspect of the present invention the is provided a mobile telephone terminal comprising at least one mobile telephone application, wherein the mobile telephone application is arranged to display to a user a presence attribute indicator for a first party with an entry associated with the telephone number of the first party. There is also provided a method of controlling the user interface appearance of a mobile telephone terminal comprising the step of: selecting an entry or entries of a mobile telephone application for which a presence attribute indicator will be obtained and displayed. There is also provided a system that comprises a server storing presence attribute information for a plurality of parties and a mobile telephone terminal wherein the mobile telephone terminal comprises at least one application, from which a telephone call can be made to a party, arranged to display to a user a presence attribute indicator for the first party in dependence upon presence attribute information received from the server.

According to a fourth aspect of the present invention the is provided a mobile telephone terminal comprising at least one mobile telephone application, wherein the mobile telephone application is arranged to display an entry associated with a first party and to provide to a user, while displaying the entry, a selectable option for initiating instant messaging with the first party. There is also provided a method of communicating with a first party from a mobile telephone application, comprising the steps of: displaying an entry associated with a first party in a mobile telephone application; and displaying a user selectable option for initiating instant messaging with the first party within the mobile telephone application.

According to a fifth aspect of the present invention the is provided a mobile telephone terminal arranged to display an entry associated with a first party and provide a customised menu of selectable options for initiating communication with the first party, wherein the selectable options displayed are dependent upon received presence attribute information for the first party. There is also provided a method of providing an intelligent choice of communication options to a user of a mobile telephone terminal comprising the steps of: receiving presence attribute information for a first party; and adapting the options, for initiating communication with the first party, displayed in to a user in dependence upon the received presence attribute information.

According to a sixth aspect of the present invention there is provided a terminal comprising: an instant messaging client for participating in an instant messaging dialogue with one or more parties; and a calendar application, for recording appointments, arranged to store the content of an instant messaging dialogue in an appointment record. There is also provided a method of recording a remote meeting comprising the steps of: creating an appointment record for the remote meeting in a calendar application; initiating an instant messaging dialogue from within the appointment record; storing the content of an instant messaging dialogue; and associating the stored instant messaging dialogue with the appointment record.

According to a sixth aspect of the present invention the is provided a terminal comprising: at least one application from which a telephone call and instant messaging can be initiated, wherein when the application accesses a stored telephone number of a party the stored instant messaging address of that party is automatically accessed or accessible and when the application accesses a stored instant messaging address of a party, the stored telephone number of that party is automatically accessed or accessible.

BRIEF DESCRIPTION OF THE DRAWINGS

For a better understanding of the embodiments of the present invention and to understand how the same may be brought into effect, reference will now be made, by way of example only, to the accompanying drawings in which:

FIG. 5 is a process flow-diagram for a Calendar application.

DETAILED DESCRIPTION OF THE INVENTION

Figure 1:
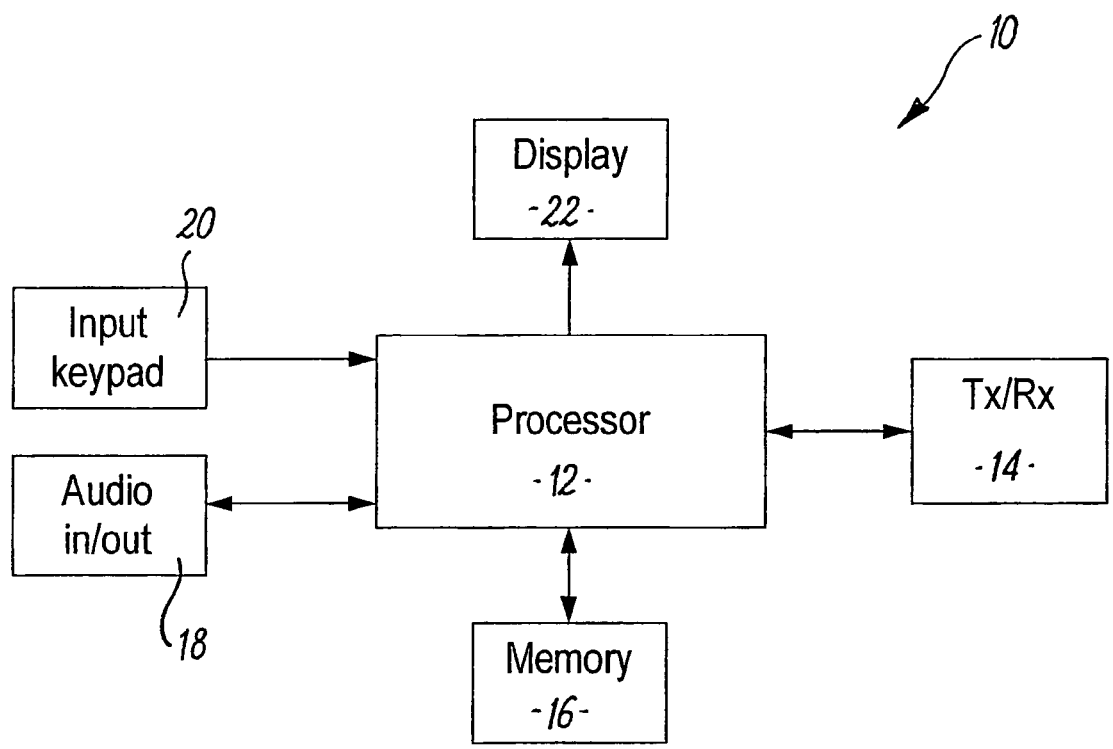
FIG. 1 illustrates a mobile telephone terminal.

FIG. 1 illustrates a mobile telephone terminal 10 for communicating in a cellular radio telecommunications network. The mobile telephone terminal 10 comprises a processor 12, a cellular radio transceiver 14, a memory 16, audio input/output 18, an input keypad 20 and a display 22. The processor 12 receives input commands from the input keypad 20, controls the output of the display 22, receives audio input from and provides audio output to the audio input/output 18, is arranged to read from and write to the memory 16 and is arranged to communicate in the cellular radio telecommunications network using the cellular radio transceiver 14.

Figure 2:
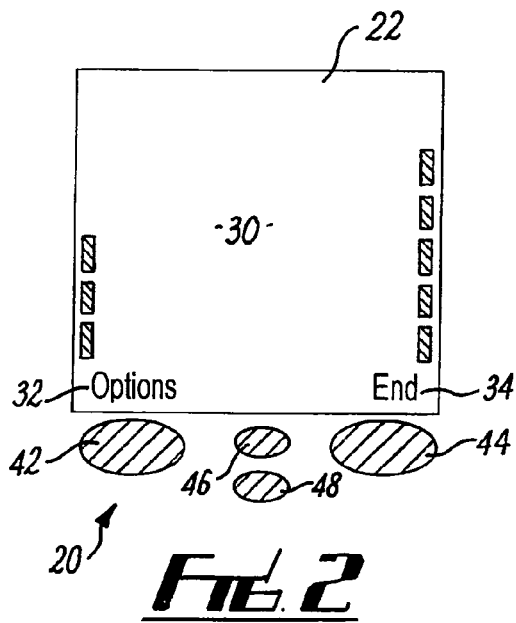
FIG. 2 illustrates one type of user interface for the mobile telephone terminal.

FIG. 2 illustrates a user interface of the mobile telephone terminal 10. The user interface includes a display 22 and an input keypad 20. The input keypad 20 has a first soft key button 42, a second soft key button 44, an up scroll key 46, a down scroll key 48 and a keypad array (not shown). The display 22 has a main central display portion 30, a first text display portion 32 adjacent the first soft key 42 and a second text display portion 34 adjacent the second soft key 44. The first text display portion 32 is used to display text indicating the function of the first soft key 42. The second display portion 34 is used to display text indicating the function of the second soft key 44. The text displayed in the first text display portion 32 and in the second text display portion 34 changes as the functions of the respective first and second soft keys change. Although, two soft keys are shown in this example, in other user interfaces a single soft key may be used.

The memory 16 stores software, which when loaded into the processor 12 controls the operation of the mobile telephone terminal 10. This software provides applications and a menu for entering the applications. The menu can be navigated using the input keypad 20. If multiple options are to be provided to a user at a particular point in the menu this can be provided via the soft keys or, if the options out-number the number of soft keys, as a list in the main display portion 30. An entry in the list can be chosen by highlighting the desired entry using the scroll keys 46, 48 and then selecting the entry using a soft key 42, 44.

The mobile telephone terminal 10 is capable of making and receiving telephone calls. It will also generally be capable of sending messages via the cellular telephone communication network. For example, in 3GPP (GSM, GPRS, WCDMA) network the mobile telephone terminal 10 may be capable of sending alphanumeric SMS messages and/or multimedia MMS messages.

The mobile telephone terminal 10 is also an Instant Messaging Client (Wireless Village embedded client) that can connect to an instant messaging server using the cellular telecommunications network as a bearer for the IMPS.

An IMPS session is established when a client logs onto an instant messaging server and is terminated when the client logs out or is logged out. If two clients are to communicate by instant messaging, they must both have a session with the server.

Instant messages can be addresses using a User-ID which is a unique instant messaging address assigned to a user. The User-ID is syntactically equivalent to an e-mail address. It has the format alphanumeric string or alphanumeric string@domain. A user may also be referred to by screen names, nicknames and aliases. Theses identifiers implicitly and explicitly refer to the User-ID.

Communication in IMPS occurs as a series of separate transactions. Each transaction consists of a request and a response between a client and a server.

An instant messaging client is able to originate and receive instant messages. To send an instant message from the client of the originator, the client initiates a Send Message Transaction. It sends a SendMessageRequest message to the server, which replies with the SendMessageResponse message. The SendMessageRequest message comprises the originator's User-ID, the recipient's User-ID and the instant message content. The server sends the instant message to the client of the recipient using a Message Delivery Transaction. The server sends the NewMessage message to the recipient client, which replies with the MessageDelivered message. The NewMessage message comprises the originator's User-ID, the recipient's User-ID and the instant message content.

An IMPS client may obtain presence information associated with a target user and/or the user's client terminal by initiating a Subscribed Presence Transaction or a Get Presence Transaction with the server. Only those attributes that are authorized for publication will be provided.

In the Subscribed Presence Transaction, the initiating client sends a SubscriberPresenceRequest message to the server and the server replies with a Status message. The SubscriberPresenceRequest message identifies the User-ID(s) of the target users(s) and the presence attributes for which notification is requested. The requesting client subsequently receives from the server the current presence information in a PresenceNotificationRequest message and will be informed of future changes to the subscribed presence attributes for the subscribed users as they happen. In order to stop continual updating of the presence information from the server it is necessary to unsubscribe at the server.

The Get Presence Transaction may be initiated at any time. The initiating client sends a GetPresenceRequest message to the server containing the target's User-ID and optionally a list of requested presence attributes. The server responds with a GetPresenceResponse message containing the result of the request and the presence attributes.

The presence attributes that can be made available include presence information about the client and presence information about the user. The information about the client (client status) may include 'online status' and 'registration'. 'Online Status' indicates whether a client has an active session i.e. is logged into an IMPS server and is therefore available for instant messaging. 'Registration' indicates whether a client device is registered in a mobile telecommunications network and should therefore be available for receiving a telephone call, SMS or MMS. The information about the user (user status) may include 'user availability', 'preferred contact' and 'contact info'. 'User Availability' indicates the availability of the user and the amount of acceptable distraction i.e. available, unavailable, selectively available. 'Preferred contact' indicates the preferred method of contact e.g. call, SMS, MMS, IM, email. A 'contact address' attribute may give the address for the preferred contact method e.g. phone number, MMS address, User-ID, email address. 'Contact Info' is a vCard (i.e. an electronic introduction card) for the user that can be sent as an MMS message.

The inventor has realized that the functionality of a mobile telephone terminal 10 and an IMPS client can be integrated more closely together, to provide an improved telecommunications terminal. Currently, the mobile telephone terminal has certain mobile telephone applications that relate to its functionality e.g. telephone calls and SMS/MMS messages and some applications that are used for organization such as a Calendar. An IMPS client in a mobile telephone has certain applications that relate to its functionality e.g. obtaining information about presence attributes and instant messaging. Although currently the IMPS client can be integrated physically within a mobile telephone terminal, the functions associated with the mobile telephone and the functions associated with the IMPS client are provided as alternatives components in the menu structure. This is inconvenient as it means that a long navigation of the menu may be required to perform a function associated with the phone and then a function associated with the IMPS. The inventors have developed a simple and innovative mechanism that allows the functionality of the mobile telephone and IMPS client to be integrated.

The terminal (mobile telephone and IMPS) 10 is arranged so that when a mobile telephone application (e.g. telephone calling, SMS messaging) has access to a telephone number for a party it also has immediate access to the IMPS address (User-ID) for that party.

A database in memory 16 associates, for each contact party, the telephone number of the party and the User-ID for that party. The mobile telephone applications (e.g. telephone calling, SMS messaging, Call Register etc) are adapted so that when an application recalls a telephone number from the database for a party, it recalls automatically, or has the ability to recall automatically, the associated User-ID for that party (if in the database). The IMPS applications (e.g. obtaining presence attributes, instant messaging) may be adapted so that when an application recalls a User-ID from the database for a party, it recalls automatically, or has the ability to recall automatically, the associated telephone number for that party (if in the database).

In one embodiment, the database storing contact information for the user (e.g. the phonebook) is arranged so that the User-ID for a party and the telephone number for the party are treated as different fields in a single entity that is associated with the party and retrievable by an application.

In one implementation, a database entry would use a data field identifying a party (e.g. a name) and a pointer field for a default contact point, which would point to a default phone number and the User-ID. When an application queries the database for an entry both fields are returned. The application can then immediately recall one or both of the telephone number and User-ID from the database using the pointer field.

In another implementation, an entry in a phonebook for a party would use a data field for the name, a data field for a default telephone number and a data field for a User-ID. When an application queries the database for a party, all the data fields for that party's entry are returned. The application can then immediately use one or other of the telephone number and the User-ID. Even though only one of the telephone number and User-ID are to be used, they are both stored in active memory so that the other is readily accessible should it be required.

The database used by the phonebook application has a data entry field for User-ID, that a user can fill in, when entering the phone number of a new party.

As a consequence of the close association of the User-ID and telephone number, an application that requires access to one of the phone number and User-ID for one mode of operation automatically has access to the other one for another mode of operation. The user only chooses whom to contact. The application, depending on the mode of operation, which may be user selected, chooses which of the phone number and User-ID will be used. The application may therefore easily switch from a communication mode using the phone number to another communication mode using the User-ID. Thus telephone modes, including telephone conversations and SMS messaging (i.e. modes using the telephone number), are interchangeable with IMPS modes, including instant messaging (a mode using the User-ID).

The functionally integrated mobile telephone terminal and IMPS client may provide any one or more of the following additional services:
1) The simple switching of a communication session between a telephone call and instant messaging.
2) The provision of presence attribute information in relation to telephone functions (e.g. in a phonebook, call register or SMS message register).
3) The initiation of instant messaging directly from a telephone function (e.g. a phonebook, call register or SMS message register).
4) The dynamic customization of a menu of communication options based on presence information.
5) The integration of instant messaging with other telephone functions (e.g. Calendar)

It is possible to continue a communication session between parties A and B by transferring the communication means from instant messaging between parties A and B to a telephone call between users A and B. In the situation in which party A and party B are engaged in instant messaging, one or other of A or B can transfer the instant messaging session into a telephone call. It is of course preferable that the transfer process cannot be unilateral but must be by mutual consent.

Figure 3A:
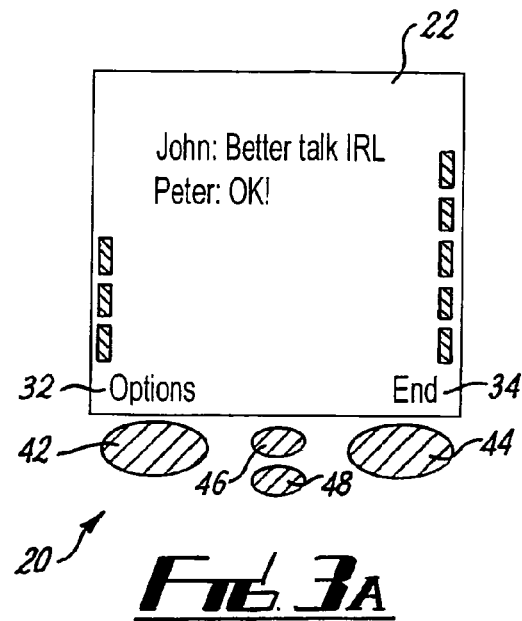
FIGS. 3A and 3B illustrate a user interface during the transfer of a communication session from instant messaging to a telephone call.

FIG. 3A illustrates the user interface of a mobile telephone terminal 10 which is being used by a user A to communicate using instant messaging with a party B. The mobile terminal used by B may have a similar user interface. In the example of FIG. 3A, the first soft key 42 is activated by user A to access available options and the second soft key 44 is activated to end the interactive messaging session. When user A presses the first soft key 42, a number of different options are displayed on the main display portion 30. The user may scroll through these options using the up scroll key 46 and the down scroll key 48 and then select one of the options using one of the first or second soft keys 42, 44. One of the options is "call". Selecting this option causes the mobile telephone terminal 10 to call the party B to whom instant messages are being sent.

In another embodiment, while instant messaging, the first soft key 42 has the associated function of initiating a call and the associated text display portion 32 displays "Call". Activating the first soft key 42, while instant messaging, initiates a call to user B without having to enter an options menu.

Figure 3B:
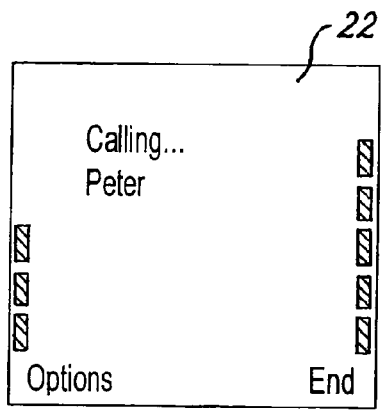

Selecting the "call" option either directly or through the options menu, immediately and automatically initiates the process for making a telephone call as shown in FIG. 3B.

To initiate a telephone call between A and B, it is necessary for either A or B to have the telephone number of the other. In the situation where user A selects the call option during the interactive messaging session, his terminal will attempt to originate the telephone call.

In the situation in which A has initiated the instant messaging session from his phonebook and has therefore recalled B's telephone number as well as his user-ID from the database, A's terminal will have B's telephone number immediately available and can therefore automatically make the call.

If A's terminal does not have B's telephone number immediately available, it may try and find a stored version of the telephone number within the terminal. This may be achieved by searching the database of terminal A using the User-ID of user B to obtain the associated mobile telephone number. It may also be achieved by searching received presence attributes for user B stored in the terminal.

If the terminal is unable to find a telephone number for user B, it may attempt to obtain user B's telephone number by initiating a Get Presence Transaction by sending a GetPresenceRequest message to the instant messaging server containing user B's user-ID and the contact address attribute. The server may respond with the address for the preferred contact method by which to contact user B which may be his telephone number. User A's terminal processes the received presence information to determine whether or not a telephone number has been received and if it has, it is extracted and used to telephone user B.

As an alternative, or in addition to, requesting the present attributes, the terminal of user A may send a special call initiation instant message to user B. This special instant message, is not a message that is displayed on the display of the terminal of user B but is a control message that enables the terminal of user B to send user B's telephone number to the terminal of user A. The call initiation instant message results in an option being presented to the user B who may decline or accept it. If it is accepted, user B's telephone number is sent automatically to user A in the body of an instant message (or an SMS message). User A's terminal extracts the telephone number from the body of the instant message (or from the SMS) and uses it to call user B.

It should be appreciated that when a user is using the instant messaging functionality, it is a simple process for them to access the telephone call functionality. There is no need for them to navigate through the menu structure, as the ability to transfer the instant messaging session to a telephone conversation is readily available.

It is also possible to transfer a telephone call to an instant messaging session. In the situation in which A and B are engaged in a telephone conversation, one or other of A or B can transfer the telephone conversation into an instant messaging session. It is of course preferable that the transfer process cannot be unilateral but must be by mutual consent.

While a user is engaged in a telephone conversation, they may select "options" by depressing the first soft key 42. One of the options consequently displayed is "start IM". If the user selects this using the up and down scroll keys 46, 48, and a soft key his terminal will start the transfer process by which the telephone conversation is transferred to an instant messaging session. In an alternative user interface arrangement, while a user is engaged in a telephone conversation, they may select "start IM" by depressing the first soft key 42.

It is assumed in the following that A and B are both logged onto an IMPS server i.e. that they are both in session. If one or both are not logged on, then they would have to log on before they can exchange instant messages. This can be done automatically without prompting for passwords.

In the situation in which user A has initiated the telephone call from his phonebook and therefore recalled the user-ID of party B as well as the telephone number of party B from the database to active memory, then the terminal of user A is simply able to send an instant message to B. This instant message will by default also include user A's user-ID and consequently both A and B will have all the necessary information to have an instant messaging chat session.

In the situation in which the user who is initiating the transfer from the telephone call into instant messaging, did not originate the telephone conversation, then the terminal may search a database associating telephone numbers and User-IDs, using the telephone number of user A obtained via call line identification (CLI). If the database has an entry for user A that contains both its telephone number and user-ID, the user-ID can be accessed and used to send an instant message to user A. This instant message will by default include the user-ID of user B and consequently both users' terminals will have the necessary information to have an instant messaging chat session.

In the situation in which the terminal which is initiating the transfer from a telephone conversation to an instant messaging chat session, e.g. the terminal of user A, does not have the user-ID of B, the terminal of user A can send an SMS to the terminal of party B that includes the user-ID of user A. The terminal of party B, when it receives this SMS, is able to extract the user-ID of user A and use this to start the instant messaging chat session. The user-ID of user A may be extracted from the SMS either by searching for an alphanumeric text string including "@" or it could be done with a settings or business card SMS message. It is of course also possible for the user who accepted the incoming call to initiate the transfer of the telephone conversation to an instant message chat session. This would be achieved by sending an SMS message to user A. This is possible because the telephone number of user A may be obtained using call line identification.

It should therefore be appreciated that if a user is involved in a telephone conversation, the user does not have to navigate through a complex menu to an IM section, choose to initiate an IM session and choose whom to talk to and then activate the process. Instead, the user can simply access the instant messaging functionality via the current mobile telephone application.

As the telephone number and user-ID are associated together, any application that primarily uses a telephone number can also use a feature of IMPS. Thus any mobile telephone application related to a telephone number such as the phonebook, the call register (missed calls, received calls, made calls etc.) and the SMS register (sent messages, received messages, etc.) can also give presence information for the user-ID associated with the relevant telephone number. The mobile telephone applications relate to sending and receiving using communication mechanisms specified for the mobile telecommunications network.

Figure 4:
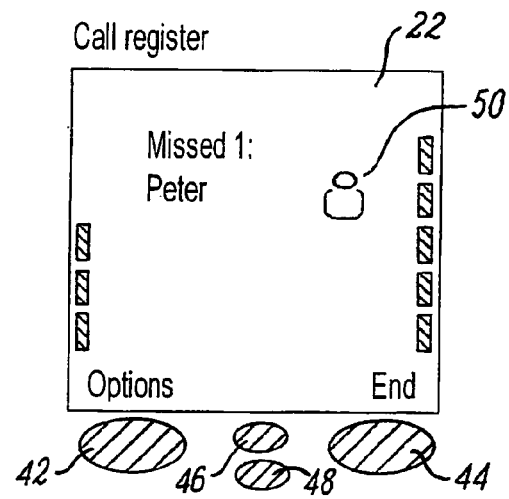
FIG. 4 illustrates a user interface for a mobile telephone application (call register)

As shown in FIG. 4, the presence information can be given by a presence indicator 50 on the display 22. The presence indicator may be in the form of a small icon, an exclamation mark, a different colour scheme or other signifying symbol next to the relevant entry for a user. The presence indicator may give an indication of the "on-line status" presence attribute of a user so that it is immediately apparent whether the user is logged on and available for instant messaging. The presence indicator may be an indication of the "registration" presence attribute and therefore indicate whether a client device is registered in a mobile communications network and should therefore be available for receiving a telephone call, SMS or MMS. The presence indicator 50 may be an indication of the "user availability" presence attribute of the user and therefore indicate whether the user is available or unavailable. The presence indicator 50 may be an indication of the "preferred contact" presence attribute and therefore indicate the preferred method of contact e.g. telephone call, SMS, MMS, instant messaging etc.

The phonebook application displays multiple entries, each of which has an associated telephone number. A telephone call can be initiated from a displayed entry to the associated telephone, number. All or selected ones of the phonebook entries display a presence attribute indicator 50.

The call register application displays any one of a set of multiple entries. There is a set of multiple entries for each of: missed calls; received calls; and calls made. Each entry has an associated telephone number. A telephone call can be initiated from a displayed entry to the associated telephone number. All or selected ones of the entries display a presence attribute indicator 50.

A text message register application displays any one of a set of multiple entries. There is a set for each of received messages and sent messages. Each entry has an associated telephone number. A telephone call can be initiated from a displayed entry to the associated telephone number. All or selected ones of the entries display a presence attribute indicator 50.

The presence attributes for one or more entries can be automatically updated by subscribing, using a Subscribed Presence Transaction, to receive updated presence attribute information. The presence attributes can be selectively updated using a Get Presence Transaction. The received presence attributes are processed to determine the appropriate presence attribute indicator for an entry in a mobile telephone application.

In FIG. 4 a telephone call register is illustrated. It indicates that a call was missed from the party "Peter". The presence attribute indicator 50 may for example indicate that the client device of that party is registered in a mobile telecommunications network and/or that the preferred contact method is by telephone call and/or that the user is available. The user may therefore choose that a telephone call is the most appropriate way of contacting the user. By selecting the first soft key 42, the options menu is entered. The user may then use the input keypad 20 to select the option for initiating the telephone call to the user. Alternatively, the presence indicator 50 may alternatively or in addition indicate that the user is logged on to the IMPS server and/or the preferred method of contact is by instant messaging and/or that the user is available. The user may therefore decide that the appropriate method of contact is by instant messaging. The user may enter the options menu by selecting the soft key 42. The option of starting an instant messaging session with the user is then selected from the options menu using the input keypad 20.

Although the above example has been given with respect to the call register it should be appreciated that it is equally applicable to the SMS register and/or the phonebook. For example, each entry in a phonebook may have a presence indicator 50 adjacent it indicating whether the person should be contacted by instant messaging, telephone call or SMS.

In the above described examples, it may be necessary to obtain presence attribute information for a large number of parties e.g. the content of a phonebook. This may place a considerable demand on a terminal. It may not therefore be appropriate to obtain presence information for all of the entries e.g. in a phone book. It is desirable for the mobile terminal to have a user configurable option so that the user can determine which entries should have presence data information associated with them and what information should be obtained.

According to one embodiment of the present invention, the options menu itself is automatically adapted or customised by the terminal in dependence upon the presence information available with respect to a certain party. Thus, if the preferred contact method for the party is by instant messaging and not by telephone call, then when the communications options menu is entered for that party, the option of starting an instant messaging session is provided but the option of starting a telephone call is not. Likewise if the preferred method of contact is by telephone conversation, then when the communications options menu is entered for that party, there may be an option to start a telephone conversation but not an option to start an instant messaging session. As another example, if the mobile terminal is not registered in a telecommunication network or the user is not available, there may not be an option of having a telephone conversation or an instant messaging session but there may be the option of sending an SMS. The SMS would be stored in the network and would be pushed to the user when they next attach to the network. Thus the menu system of the mobile telephone terminal may be dynamic in that it changes in dependence upon the presence information received. This allows, in particular, menu options for communicating with a particular party to be automatically and dynamically customised. As an example, the options available from the phonebook may be dynamically varied in dependence upon the presence information received for a particular contact entry. Thus for an entry in a telephone book for one party, there is presented the options of contacting that party by telephone call, SMS or instant messaging whereas for an entry for another party there may only be presented the option of contacting that other party by instant messaging only.

It is also possible to integrate instant messaging into other functions of the mobile telephone terminal, such as the calendar application. The calendar application is adapted so that a reminder to participate in an instant messaging meeting can be entered into the calendar at a particular date. The reminder includes the user-ID of each of the intended participants of the instant messaging meeting. When the time and date for the meeting arrives, the mobile telephone terminal offers the user the opportunity to automatically initiate the meeting via instant messaging. The dialogue that occurs during the meeting is displayed on the display 22 but is in addition stored in memory 16. At the end of the meeting, the user is given the option of storing the recorded dialogue of the interactive instant messaging meeting as a note associated with the entry for the meeting in the calendar. Thus, when the meeting entry in the calendar is opened in the future, it is possible to review the content of the instant messaging meeting.

This process of using the calendar is illustrated in more detail in FIG. 4. At step 100, the user enters the calendar application for recording an appointment. At step 102 the user selects a date. At step 104 the selects the appointment type as a meeting. At step 106 the user is prompted for and enters the text describing the purpose of the meeting. At step 108 the user is prompted for and enters the time of the meeting. At step 110, the user is prompted for and enters the names or aliases of the attendees. At step 112 the user is prompted to indicate what type of meeting it is for example whether or not it is an instant messaging meeting. If the meeting is to be an instant messaging meeting, then the calendar application at step 114 sends out an invitation to all attendees. This may be sent as an instant message, if possible, or as an SMS. The appointment record is then entered in the calendar at step 116 and the user exits the application.

When the date and time for the appointment comes around, an alert for the IM meeting goes off at step 120. At step 122, the terminal checks the presence information on the intended attendees for the meeting to determine whether or not they are available. It checks to discover the "on-line status" of the attendees. If the terminal does not have this information, it initiates a get presence transaction. It sends a GetPresenceRequest message to the server containing the user-IDs of the intended attendees and also identifies the on-line status presence attribute. At step 124, the appointment record is opened and the user is informed of which attendees are available for instant messaging. A presence attribute indicator may be displayed with each attendee. At step 126, the user is prompted to decide whether or not to initiate the IM meeting. If the IM meeting is initiated the process proceeds to step 128. At step 128, the mobile terminal initiates the IM session using the user-IDs of all the available attendees. If necessary, the terminal automatically logs on to the instant messaging server. At step 130 the IM session occurs and the dialogue is stored in the memory. At step 132 the IM session is terminated by the user. At step 134 the user is prompted whether or not they wish to save the stored dialogue in the appointment record. If the user chooses to save the stored dialogue, they are given an opportunity to edit the dialogue at step 136 and before it is imported into the appointment at step 138 and the appointment saved at step 140. The user then exits the application at step 142. If the user decides not to initiate the IM session at step 126 or decides not to store the saved dialogue at step 134 the process jumps to step 142 and exits the application.

Although embodiments of the present invention have been described in the preceding paragraphs with reference to various examples, it should be appreciated that modifications to the examples given can be made without departing from the scope of the invention as claimed. For example embodiments of the present invention may find application in terminals other than mobile telephone terminals such as personal digital assistants, portable computers or computer terminals than have an embedded instant messaging client.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
   a user interface;
   a processor; and
   a memory that stores computer program code, at least one mobile telephone application, an instant messaging client and a database comprising entries in which an instant messaging address of a party and a telephone number of the party are associated together in an entry associated with the party,
   where the memory and computer program code are configured, with the processor, to cause the apparatus at least to display via said user interface with the mobile telephone application an entry associated with a first party and to provide to a user, while displaying the entry, a selectable option that is configured by said user interface to initiate instant messaging with the first party using the instant messaging address stored in the entry.

2. The apparatus as claimed in claim 1, wherein the processor automatically initiates communication with the first party after user selection of the provided option without further user intervention.

3. The apparatus as claimed in claim 2, wherein the user selectable option is selected by a single keystroke during the telephone call.

4. The apparatus as claimed in claim 1, wherein the user selectable option is one of many user selectable options that are provided as a menu at the instigation of the user.

5. The apparatus as claimed in claim 4, wherein the instigation involves a single key-stroke during the telephone call.

6. The apparatus as claimed in claim 1 wherein the mobile telephone application is comprised of a call register application that is configured to access said database to display multiple entries, each of which has an associated telephone number and to enable the initiation of a telephone call to the associated telephone number.

7. The apparatus as claimed in claim 6, wherein the call register application displays at least one of a first set of multiple entries for missed calls and a second set of multiple entries for received calls and a second set of multiple entries for calls made.

8. The apparatus as claimed in claim 1, wherein the mobile telephone application is comprised of a text message register application that is configured to access said database to display multiple entries, each of which has an associated telephone number and to enable the initiation of a text message communication to the associated telephone number.

9. The apparatus as claimed in claim 8, wherein the text message register application displays at least one of a first set of multiple entries for received text messages and a second set of multiple entries for text messages sent.

10. The apparatus as claimed in claim 1, where said processor is configured with said instant messaging client to automatically log on to an instant messaging server.

11. The apparatus as claimed in claim 1 configured to search the database for an instant messaging address using an associated telephone number.

12. The apparatus as claimed in claim 1, wherein the displayable entry is associated with the telephone number of the first party.

13. The apparatus as claimed in claim 1, wherein the apparatus further comprises a cellular radio transceiver for transmitting and receiving in a cellular radio communications network using predetermined communication mechanisms specified for that network and the mobile telephone application comprises an application relating to transmission and/or reception of information using one or more of the specified communication mechanisms.

14. The apparatus as claimed in claim 1, wherein the mobile telephone application is comprised of a phonebook application that is configured to access said database to display multiple entries, each of which has an associated telephone number and to enable-the initiation of a telephone call to the associated telephone number.

15. The apparatus as claimed in claim 1, wherein if the database stores the first party's instant messaging address said processor is configured with said instant messaging client to initiate instant messaging by sending an instant message to the first party.

16. The apparatus as claimed in claim 1, wherein if the database does not store the first party's instant messaging address said processor is configured with said instant messaging client to initiate instant messaging by sending the user's instant messaging address to the first party.

17. The apparatus as claimed in claim 1, where said processor is configured to obtain automatically an instant messaging address from a received text message.

18. An apparatus, comprising:
a user interface;
a processor; and
a memory that stores computer program code, where the memory and computer program code are configured, with the processor, to cause the apparatus at least to provide via said user interface a user with a selectable option during a telephone call with a first party, the selection of which initiates communication with the first party by instant messaging;
where said memory further stores a database comprising entries, and in which an instant messaging address of the first party and a telephone number of the first party are associated together in an entry associated with the first party.

19. The apparatus as claimed in claim 18, wherein the user selectable option is one of many user selectable options that are provided as a menu during a telephone call at the instigation of the user.

20. The apparatus as claimed in claim 19 wherein the initiation of communication with the first party by instant messaging involves a single key-stroke during the telephone call.

21. The apparatus as claimed in claim 18, wherein a terminal automatically initiates communication with the first party by instant messaging after user selection of the provided option without further user intervention.

22. The apparatus as claimed in claim 18, wherein the user selectable option is selected by a single keystroke during the telephone call.

23. The apparatus as claimed in claim 18 configured to automatically log on to an instant messaging server.

24. The apparatus as claimed in claim 18, wherein if the database stores the first party's instant messaging address said processor initiates communication by sending an instant message to the first party.

25. The apparatus as claimed in claim 18, wherein if the database does not store the first party's instant messaging address said processor initiates communication by sending the user's instant messaging address to the first party.

26. The apparatus as claimed in claim 18 configured to obtain automatically an instant messaging address from a received text message.

27. The apparatus as claimed in claim 18 configured to search the database for an instant messaging address using an associated telephone number.

28. The apparatus as claimed in claim 18 where said user interface comprises a display to display a user selectable option or options and a user input configured to enable the user to select a displayed option;
and further comprising an instant messaging client configured to initiate instant messaging;
where said processor is responsive to a selected option that indicates the initiation of instant messaging to enable the instant messaging client.

29. An apparatus, comprising:
a processor; and
a memory that stores computer program code, at least one application from which a telephone call and instant messaging can be initiated, and a database comprising entries in which an instant messaging address of a party and a telephone number of the party are associated together in an entry associated with the party,
where the memory and computer program code are configured, with the processor, to cause the apparatus at least to, when the application accesses a stored telephone number of a party in the database the stored instant messaging address of that party is automatically accessed or accessible and when the application accesses a stored instant messaging address of a party in the database, the stored telephone number of that party is automatically accessed or accessible.

30. The apparatus as claimed in claim 29, where said processor is configured to search the database for an instant messaging address using an associated telephone number.

31. The apparatus as claimed in claim 29, where said processor is configured to search the database for a telephone number using an associated instant messaging address.

32. A method comprising:
changing a mechanism by which a first party and a second party communicate during a communication session by communicating via a telephone call between the first and second parties; and
displaying a user selectable option on a display of a communication device during the telephone call to at least one of the parties, the selection of which initiates the establishment of instant messaging between the parties, where
the communication device comprises a memory that stores a database comprising entries, and in which an instant messaging address of a party and a telephone number of the party are associated together in an entry associated with the party.

33. A system comprising apparatus to provide communication between a first party and a second party using a telephone call and instant messaging,
the system comprising a user interface and a data processor that operates in accordance with a program stored in a memory, where said processor is configured with the program in response to user input via said user interface to switch a communication session between the parties from a telephone call to instant messaging, where the memory also stores a database comprising entries, and in which an instant messaging address of a party and a telephone number of the party are associated together in an entry associated with the party.

34. A method, comprising:
displaying on a display of a mobile telephone an entry associated with a first party, where displaying comprises accessing a database associated with a mobile telephone application, where the database comprises a part of the mobile telephone and stores entries, each entry configured to store an instant messaging address of a party in association with a telephone number of the party; and
displaying on the display a user selectable option for enabling via user input an instant messaging client of the mobile telephone to initiate instant messaging with the first party using the instant messaging address of the first party that is retrieved from the database that comprises part of the mobile telephone.

* * * * *